US011747355B2

(12) United States Patent
Yabutani et al.

(10) Patent No.: US 11,747,355 B2
(45) Date of Patent: *Sep. 5, 2023

(54) AUTOMATIC ANALYSIS DEVICE

(71) Applicant: HITACHI HIGH-TECH CORPORATION, Tokyo (JP)

(72) Inventors: Chie Yabutani, Tokyo (JP); Takumi Yamada, Tokyo (JP); Masahiko Iijima, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 64 days.

This patent is subject to a terminal disclaimer.

(21) Appl. No.: 17/481,427

(22) Filed: Sep. 22, 2021

(65) Prior Publication Data

US 2022/0003794 A1 Jan. 6, 2022

Related U.S. Application Data

(63) Continuation of application No. 16/479,687, filed as application No. PCT/JP2018/005244 on Feb. 15, 2018, now Pat. No. 11,156,625.

(30) Foreign Application Priority Data

Mar. 7, 2017 (JP) .............................. 2017-042328

(51) Int. Cl.
*G01N 35/02* (2006.01)
*G01N 35/00* (2006.01)
*G01N 35/10* (2006.01)

(52) U.S. Cl.
CPC ..... *G01N 35/025* (2013.01); *G01N 35/00663* (2013.01); *G01N 35/00693* (2013.01);
(Continued)

(58) Field of Classification Search
None
See application file for complete search history.

(56) References Cited

U.S. PATENT DOCUMENTS

2004/0096361 A1  5/2004  Matsubara et al.
2005/0175506 A1  8/2005  Matsubara et al.
(Continued)

FOREIGN PATENT DOCUMENTS

JP   2000-227434   8/2000
JP   2001-013151   1/2001
(Continued)

OTHER PUBLICATIONS

International Search Report of PCT/JP2018/005244 dated Apr. 3, 2018.

*Primary Examiner* — P. Kathryn Wright
(74) *Attorney, Agent, or Firm* — MATTINGLY & MALUR, PC

(57) ABSTRACT

An automatic analysis device is provided with: a sample disk for holding a sample container that accommodates a sample; a reagent disk for holding a reagent container that accommodates a reagent; at least two different measuring units that respectively perform different types of analyses; a control part that controls the measuring units; and a display part that displays: a work flow area in which the flow of operation of the two or more measuring units is displayed; and an overview area in which the usable or unusable states of the respective measuring units are displayed, wherein the overview area has a unit necessity-of-use selection part that can select whether using each of the measuring units is necessary, and the control part controls the display part so as to change the display of the work flow area on the basis of the information set in the unit necessity-of-use selection part.

14 Claims, 13 Drawing Sheets

(52) U.S. Cl.
CPC ............... *G01N 35/1002* (2013.01); *G01N 2035/00673* (2013.01)

(56) References Cited

U.S. PATENT DOCUMENTS

| | | |
|---|---|---|
| 2012/0109529 A1 | 5/2012 | Ariyoshi |
| 2020/0049724 A1 | 2/2020 | Shibuya et al. |

FOREIGN PATENT DOCUMENTS

| | | | |
|---|---|---|---|
| JP | 2004-28932 | | 1/2004 |
| JP | 2007-040883 | | 2/2007 |
| JP | 200740883 A | * | 2/2007 |
| WO | 2006/107016 | | 10/2006 |

* cited by examiner

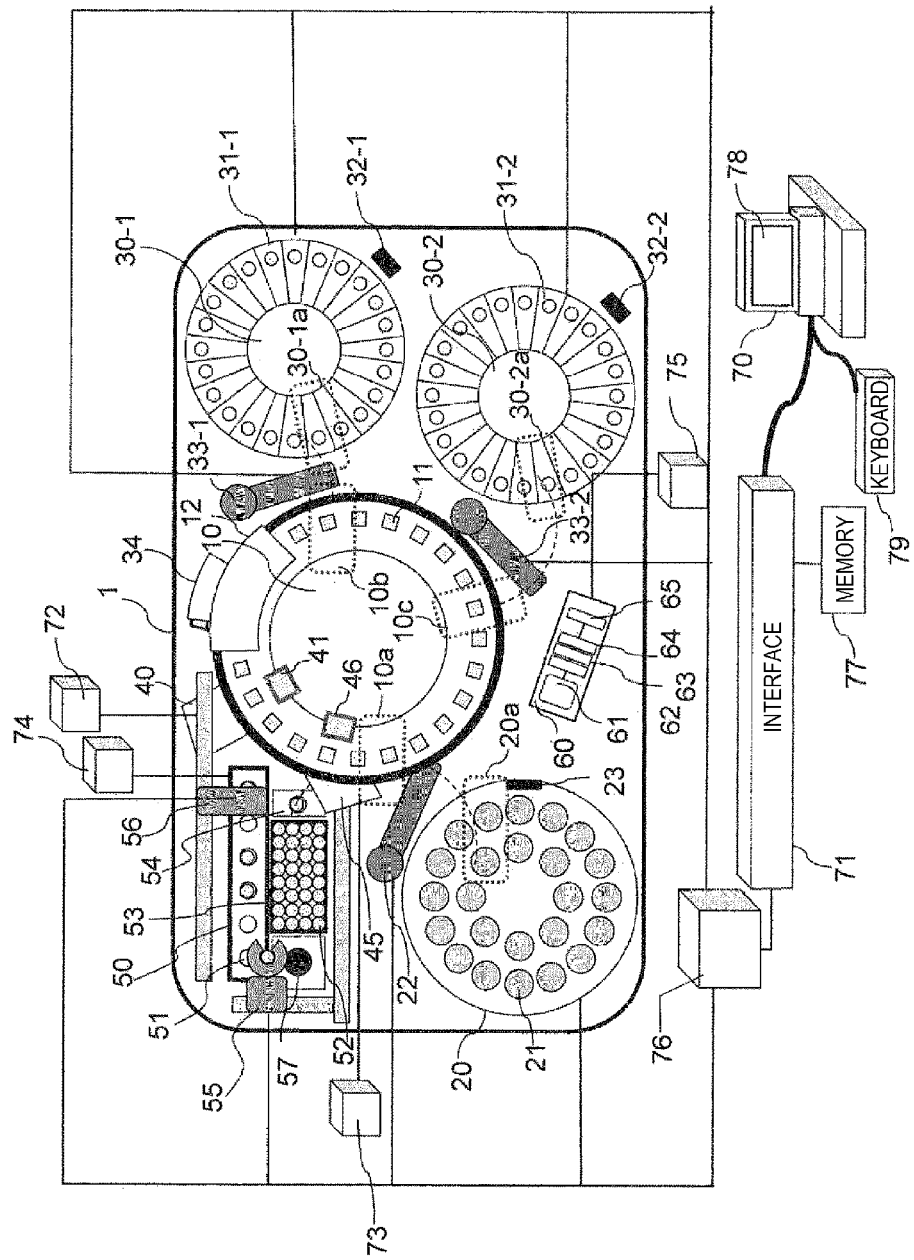
[FIG. 1]

[FIG. 2(a)]
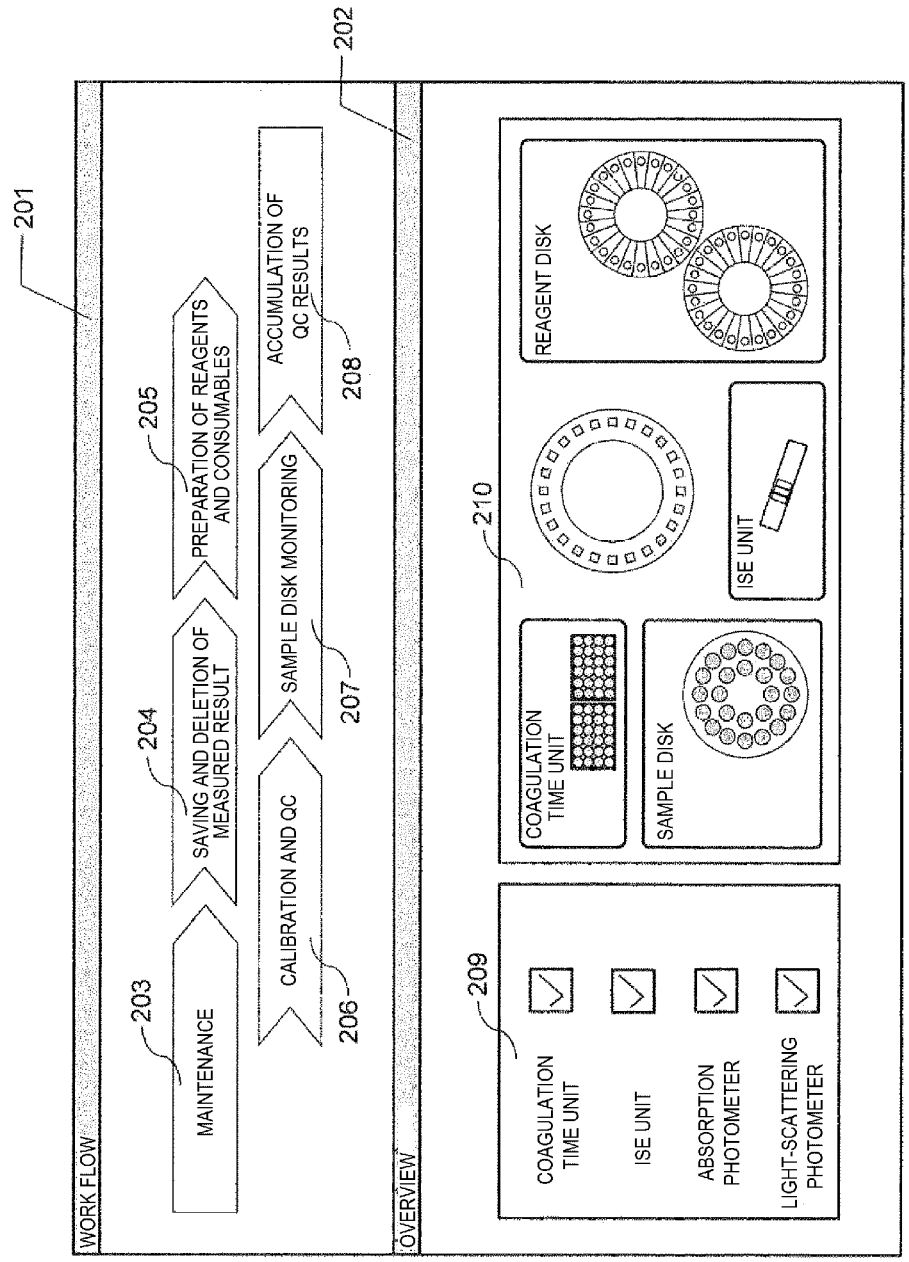

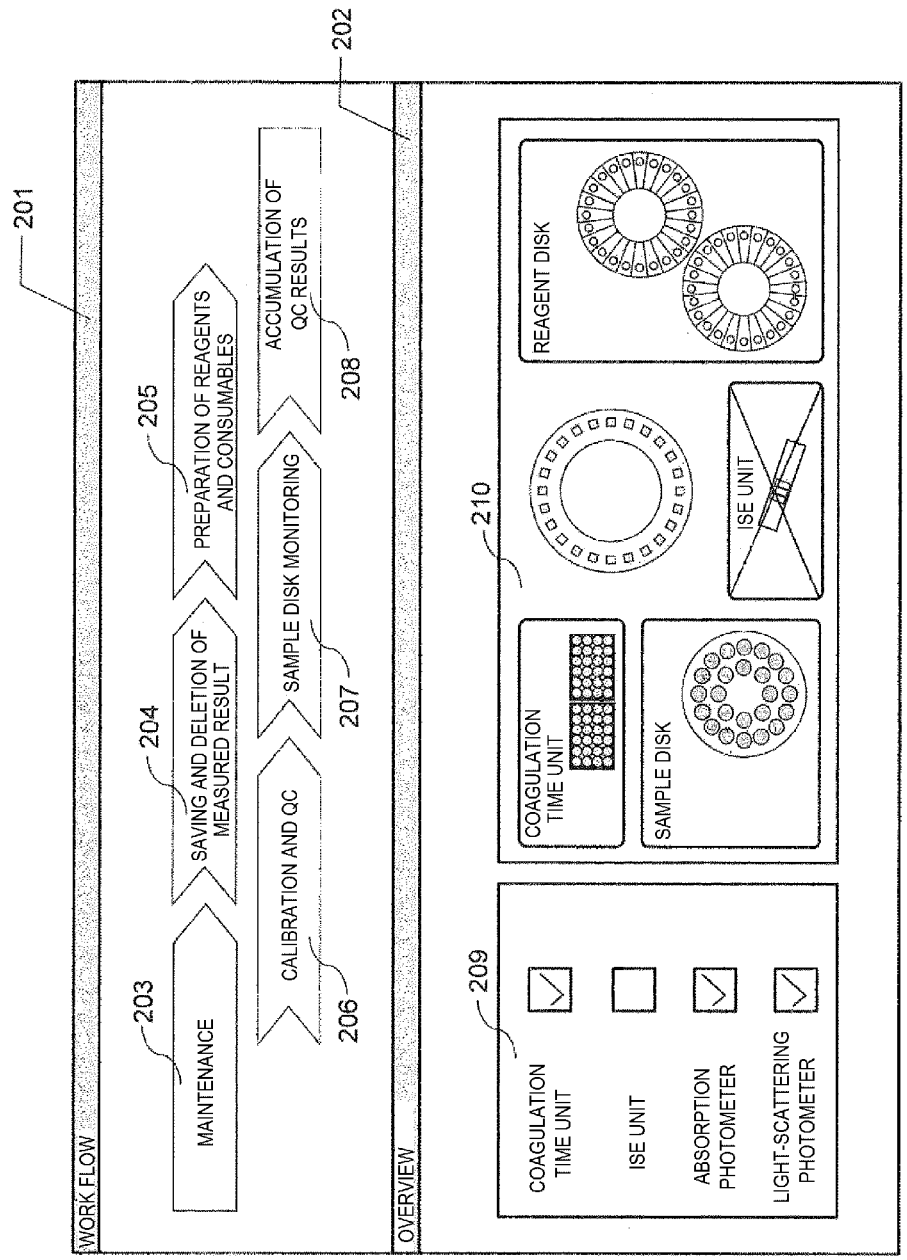

[FIG. 2(c)]
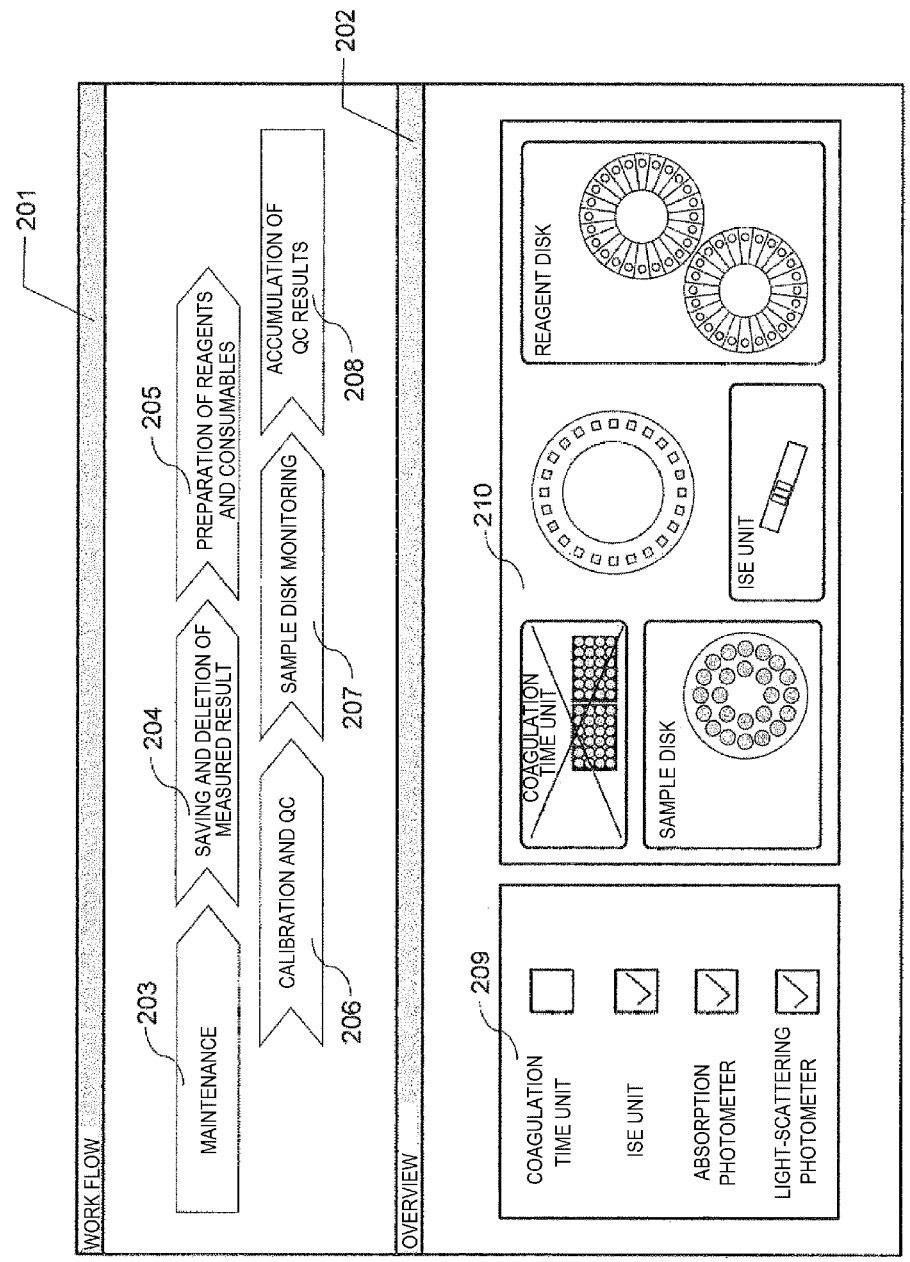

- ◉ DISPLAY ALL MAINTENANCE
- ◉ NOT DISPLAY REAGENT USED BY MASKED UNIT

| No. | MAINTENANCE TYPE | No. | MAINTENANCE NAME | DATE/TIME |
|---|---|---|---|---|
| 1 | | 1 | RESET | 2010/03/03 15:24 |
| 2 | | 2 | ABSORPTION PHOTOMETER CHECK | 2010/03/03 08:15 |
| 3 | | 3 | CELL BLANK MEASUREMENT | 2010/03/03 09:00 |
| 4 | | 4 | REACTION TANK WATER REPLACEMENT | 2010/03/03 08:30 |
| 5 | | 5 | AIR PURGE | 2010/03/03 08:45 |
| 6 | | 6 | REACTION SYSTEM WASHING | 2010/02/23 17:30 |
| 7 | | 7 | ISE PRIME | 2010/02/25 09:22 |
| 8 | | 8 | CELL DETERGENT PRIME | 2010/02/20 15:30 |
| 9 | | 9 | REACTION TANK CLEANING | 2010/02/23 17:55 |
| 10 | | 10 | MANUAL CLEANING | 2009/09/23 17:22 |
| 11 | | 11 | REACTION CELL REPLACEMENT | 2010/02/15 17:24 |
| 12 | | 12 | LIGHT SOURCE LAMP REPLACEMENT | 2009/12/23 17:02 |
| 13 | | 13 | PARAMETER READING/WRITING | 2009/05/13 17:02 |
| 14 | | 14 | PROBE WASHING | 2010/03/02 18:12 |
| 15 | | 15 | | |
| 16 | | 16 | | |
| 17 | | 17 | | |
| 18 | | 18 | | |
| 19 | | 19 | | |
| 20 | | 20 | | |

SELECT

[FIG. 3(b)]

○ DISPLAY ALL MAINTENANCE
● NOT DISPLAY RECOMMENDATION OF MAINTENANCE TO BE PERFORMED IN MASKED UNIT

302

| No. | MAINTENANCE NAME | DATE/TIME |
|---|---|---|
| 1 | RESET | 2010/03/03 15:24 |
| 2 | ABSORPTION PHOTOMETER CHECK | 2010/03/03 08:15 |
| 3 | CELL BLANK MEASUREMENT | 2010/03/03 09:00 |
| 4 | REACTION TANK WATER REPLACEMENT | 2010/03/03 08:30 |
| 5 | AIR PURGE | 2010/03/03 08:45 |
| 6 | REACTION SYSTEM WASHING | 2010/02/23 17:30 |
| 7 | ISE PRIME | 2010/02/25 09:22 |
| 8 | CELL DETERGENT PRIME | 2010/02/20 15:30 |
| 9 | REACTION TANK CLEANING | 2010/02/23 17:55 |
| 10 | MANUAL CLEANING | 2009/09/23 17:22 |
| 11 | REACTION CELL REPLACEMENT | 2010/02/15 17:24 |
| 12 | LIGHT SOURCE LAMP REPLACEMENT | 2009/12/23 17:02 |
| 13 | PARAMETER READING/WRITING | 2009/05/13 17:02 |
| 14 | PROBE WASHING | 2010/03/02 18:12 |
| 15 | | |
| 16 | | |
| 17 | | |
| 18 | | |
| 19 | | |
| 20 | | |

SELECT

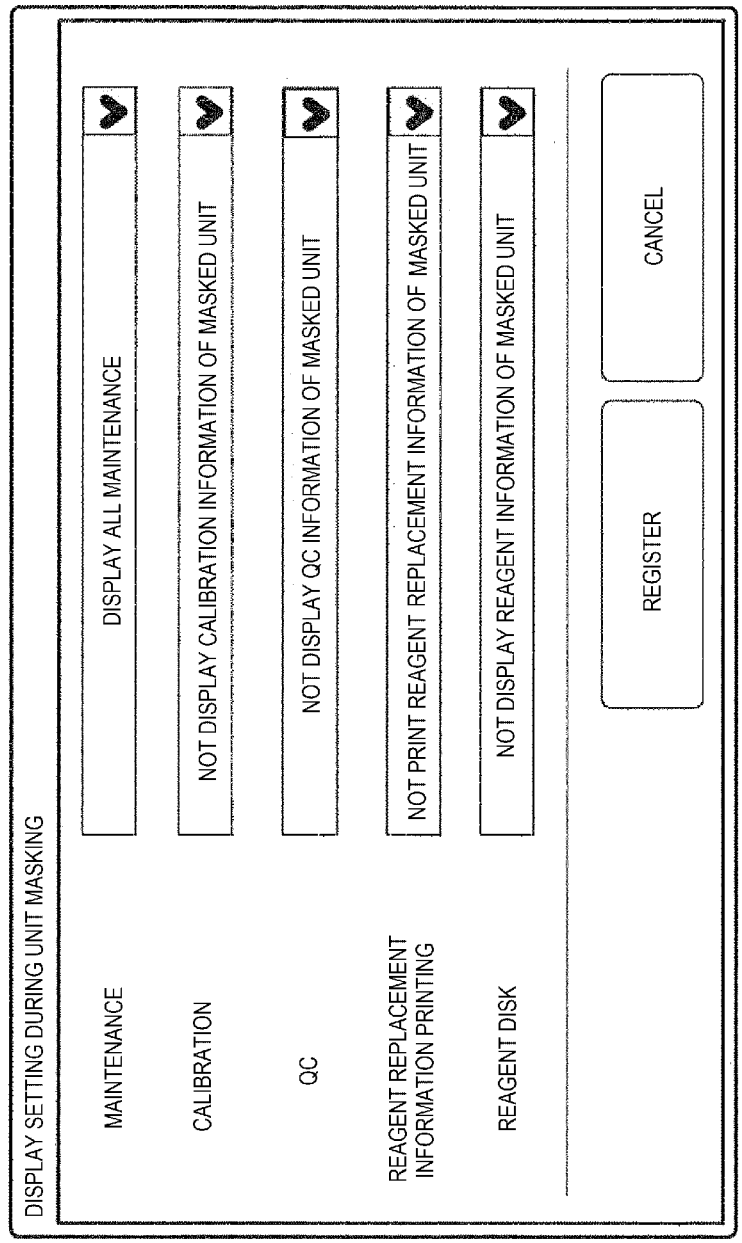
[FIG. 4]

[FIG. 5]

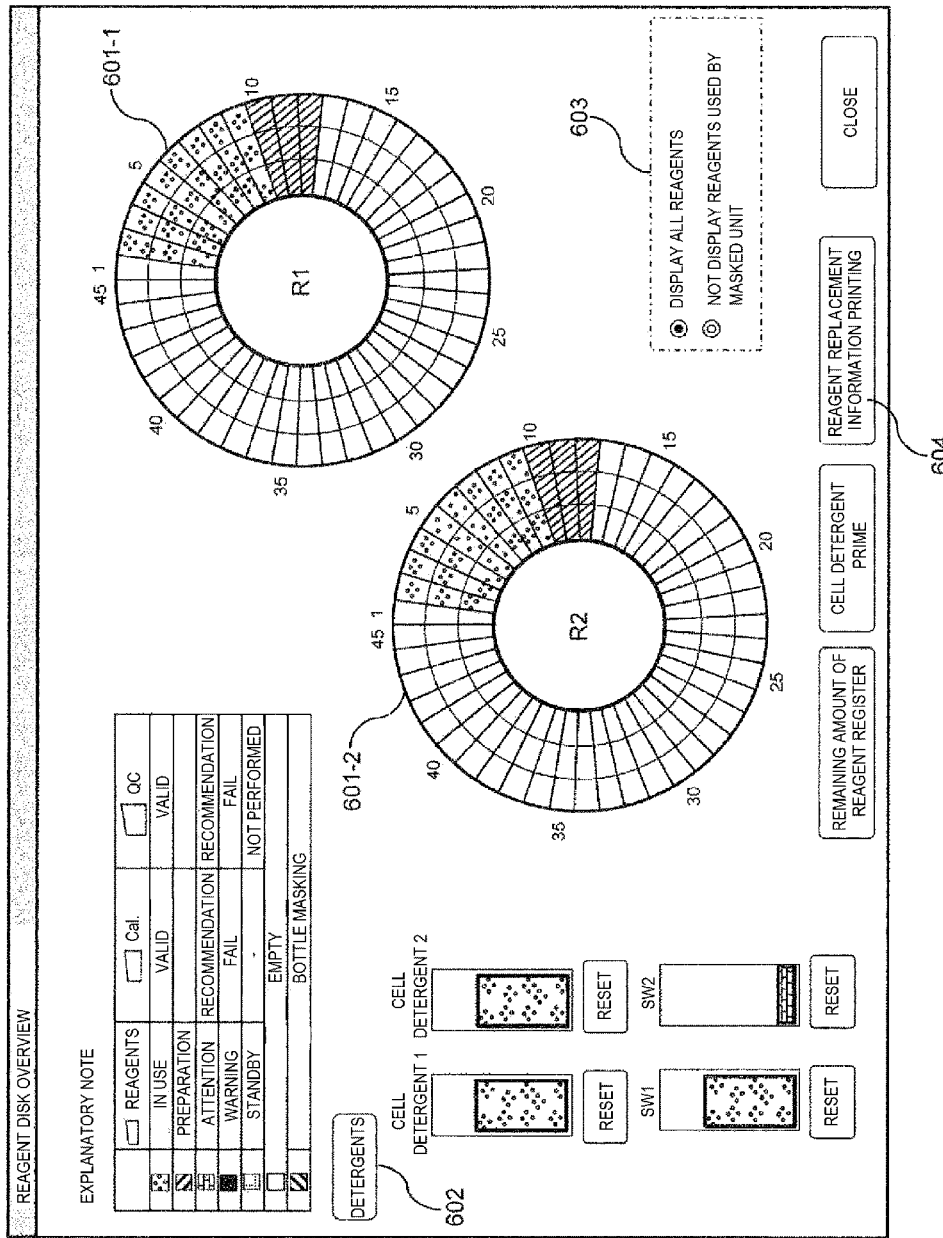
[FIG. 6(a)]

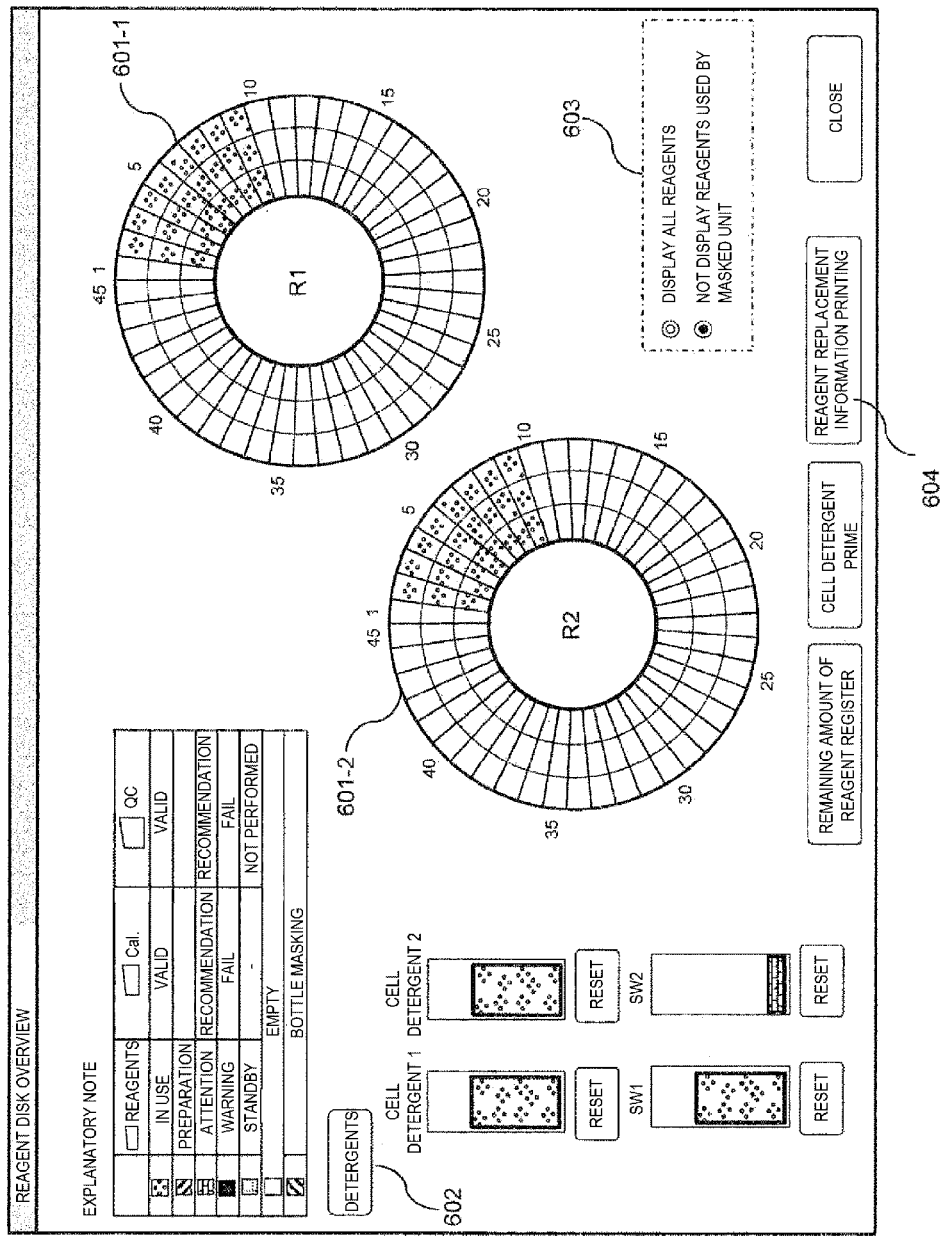
[FIG. 6(b)]

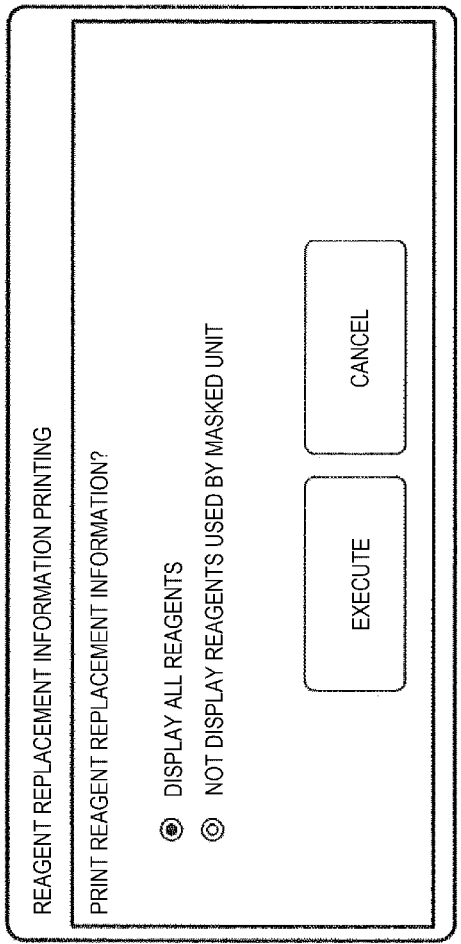
[FIG. 7]

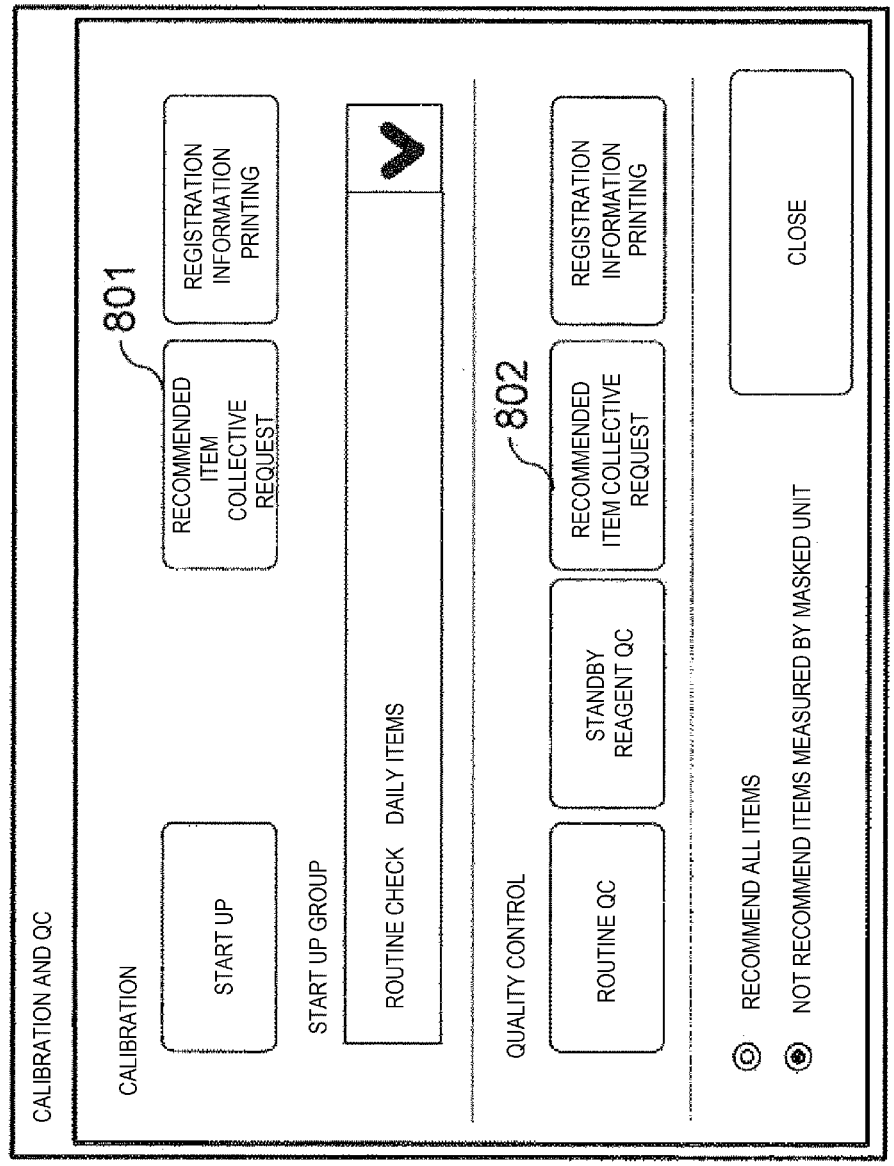

[FIG. 9]

| POSITION | ITEM | CALIBRATION TYPE | RECOMMENDATION FACTOR | EXECUTION METHOD |
|---|---|---|---|---|
| 1 | AST | LOT | REAGENT REPLACEMENT | ALL ITEMS |
| 2 | ALP | LOT | | |
| 3 | T-CHO | LOT | | |
| 4 | HDL | LOT | QC FAIL | ALL ITEMS |
| 5 | LDL | LOT | | |
| 6 | LD | LOT | | |
| 7 | TP | LOT | | |
| 8 | BNU | REAGENT BOTTLE | REAGENT REPLACEMENT | ALL ITEMS |
| 9 | ALB | LOT | | |
| 10 | Hb | LOT | | |
| 11 | HbA1c | LOT | | |
| 12 | Ca | LOT | | |
| 13 | PT | LOT | REAGENT REPLACEMENT | |
| 14 | APTT | LOT | | |
| 15 | Fbg | LOT | | |

901

ROUTINE CHECK

REQUEST START UP

EXECUTION METHOD

BLANK

2 POINTS

ALL ITEMS

SPAN

NO SETTING

◎ RECOMMEND ALL ITEMS
● NOT RECOMMEND ITEMS MEASURED BY MASKED UNIT

CALIBRATION TRACE

CALIBRATION RESULT

REACTION PROCESS

REGISTER

AUTOMATIC ANALYSIS DEVICE

TECHNICAL FIELD

The present invention relates to an automatic analysis device that analyzes an amount of a component contained in a sample such as blood or urine, and particularly to an automatic analysis device capable of measuring a biochemical analysis item and a blood coagulation time item.

BACKGROUND ART

Sample tests, in which samples such as blood and urine collected from a patient are handled, are classified into a plurality of test fields such as a biochemical test, an immunological test, and a blood coagulation test, and these test results are combined to check a diagnosis or a therapeutic effect.

For example, tests that analyze components such as blood and urine include the biochemical test that reacts a reagent with a sample to measure components such as a sugar, a lipid, a protein, and an enzyme, and include the immunological test that measures an antibody produced when a bacterium or a virus enters a body, a hormone, a tumor marker and the like by an antigen-antibody reaction. Generally, in the biochemical test, a measurement is performed using a biochemical automatic analysis device that mixes the sample with the reagent to measure a change in color caused by a chemical reaction, by transmitted light, and in the immunological test, a measurement is performed using an immunological test device that causes an antigen antibody reaction to occur by adding an antibody in which a light emitting body is bound to an antigen contained in a sample, and that measures a light emission amount by the bound antibody after a non-bound antibody is washed. However, in recent years, due to development of measuring instruments and measuring reagents, even in the biochemical automatic analysis device, it is possible to use measurement methods such as an immunonephelometry method or a latex agglutination method to perform measurement with high sensitivity by the transmitted light or scattered light, and it is possible to measure a part of the tumor markers, the hormones, and the like, so that a single device can deal with the case that a test item requires various devices according to the related art, and difference between the two cases is becoming smaller.

The blood coagulation test includes a test for measuring a control factor of a blood coagulation reaction such as ATIII, an enzyme that works in a stage of fibrinolysis such as PIC, and a byproduct produced by a fibrinolysis reaction such as D dimer, FDP, and the like by a change in absorbance, and includes a test for measuring blood coagulation time (hereinafter, may be simply referred to as a hemostatic function test, or blood coagulation time measurement or the like) which is a test of hemostatic functions of PT, APTT, fibrinogen and the like. The test of the hemostatic functions activates a blood coagulation factor contained in the sample, advances the blood coagulation reaction and measures deposited fibrin. In recent years, a blood coagulation test device has also appeared which corresponds to both the absorbance measurement and the blood coagulation time measurement so as to be capable of covering these blood coagulation test items.

PTL 1 relates to a device in which a plurality of measuring units for performing tests having different measuring principles such as a biochemical test, an immunological test, and a hemostatic function test are integrated into one device, and discloses that a space is saved by sharing a part of components in the device, such as a reagent supply unit and a reagent transport unit.

PTL 2 describes a technique. That is, in an automatic analysis system in which a plurality of analysis units are connected via a transport line, analysis units that require preparation operations are distinguished and displayed by color coding and the like while operations required for an operator are displayed on a screen by reflecting a state of a device at that time, so that even if being unfamiliar with an operation of the device, the operator can perform the preparation operations without error on the analysis units that require the preparation operations.

PRIOR ART LITERATURE

Patent Literature

PTL 1: WO 2006/107016
PTL 2: JP-A-2004-28932

SUMMARY OF INVENTION

Technical Problem

When a plurality of types of analyses having different measuring items are measured by a single device or system, a variety of preparations such as various maintenance, replacement of reagents and consumables, calibration, quality control and the like are required in each device and measuring unit, so that the work is complicated and time-consuming. In particular, in a device in which a plurality of functions are integrated, there are many cases where an operator unfamiliar with the device uses the device at night, and when these preparations are performed, simplification of the work is required. For example, when one of the measuring units cannot be used for some reason, it is required to avoid useless work as much as possible.

However, in any of the above-described PTL 1 and PTL 2, no consideration is given to efficiency of the work in a state where one of the measuring units cannot be used. For this reason, as in PTL 1, in the analysis device where reagents and samples are commonly managed by one system, and are respectively assigned to a plurality of different analysis units according to analysis items, in a case where the analysis units that require the preparation operations are distinguished and displayed by color coding or the like as in PTL 2, even when one of the analysis units is not used for some reason, such a fact is not reflected. Therefore, unnecessary preparations of reagents and the like may be promoted, and as a result, useless work may occur.

Solution to Problem

As an aspect for solving the above problems, there is provided an automatic analysis device which includes a sample disk configured to hold a sample container that is configured to accommodate a sample, a reagent disk configured to hold a reagent container that is configured to accommodate a reagent, at least two different measuring units configured to respectively perform different types of analyses, a control part configured to control the measuring units, and a display part configured to display a work flow area in which a flow of operation of the two or more measuring units is displayed, and an overview area in which usable or unusable states of the respective measuring units are displayed. The overview area includes a unit necessityof-use selection part that allows selecting of necessity-of-use of each of the measuring units, and the control part is configured to control the display part to change a display of the work flow area on the basis of information set in the unit necessity-of-use selection part.

Advantageous Effect

According to the above aspect, in an composite automatic analysis device that includes a plurality of analysis units each carrying a plurality of functions, information is provided to an operator by reflecting the information on a display so as not to recommend advance preparations related to an unused analysis unit while necessity-of-use for each analysis unit can be selected, so that a time loss due to the unnecessary preparations can be eliminated. Here, preparation information includes preparations of reagents, calibration, control measurement, maintenance and the like.

Unintentional preparations of the reagents or the like are avoided, so that the reagents cannot be opened unintentionally, and deterioration of the reagents due to evaporation or a change in pH can be prevented. Further, the calibration, the control measurement and the maintenance are also performed at a timing suitable for performing measurement while unnecessary execution is prevented, so that analysis can be performed under more appropriate conditions, which contributes to obtaining highly accurate and reliable analysis results.

BRIEF DESCRIPTION OF DRAWINGS

FIG. 1 is a diagram showing a basic configuration of a composite automatic analysis device according to an embodiment.

FIG. 2(a) is a diagram showing an example of a system overview screen of the automatic analysis device according to the present embodiment.

FIG. 2(b) is a diagram showing an example of a system overview screen of the automatic analysis device according to the present embodiment.

FIG. 2(c) is a diagram showing an example of a system overview screen of the automatic analysis device according to the present embodiment.

FIG. 3(a) is a diagram showing an example of a maintenance screen of the automatic analysis device according to the present embodiment.

FIG. 3(b) is a diagram showing an example of a maintenance screen of the automatic analysis device according to the present embodiment.

FIG. 4 is a diagram showing an example of a display setting screen during unit masking of the automatic analysis device according to the present embodiment.

FIG. 5 is a diagram showing an example of a maintenance cycle setting screen of the automatic analysis device according to the present embodiment.

FIG. 6(a) is a diagram showing an example of a reagent disk overview screen of the automatic analysis device according to the present embodiment.

FIG. 6(b) is a diagram showing an example of a reagent disk overview screen of the automatic analysis device according to the present embodiment.

FIG. 7 is a diagram showing an example of a reagent replacement information printing screen of the automatic analysis device according to the present embodiment.

FIG. 8 is a diagram showing an example of a calibration and QC screen of the automatic analysis device according to the present embodiment.

FIG. 9 is a diagram showing an example of a calibration recommendation screen of the automatic analysis device according to the present embodiment.

DESCRIPTION OF EMBODIMENTS

Hereinafter, an embodiment for implementing the invention will be described in detail with reference to the accompanying drawings. Throughout the description below, components having the same functions in the respective drawings are denoted by the same reference numerals, and the description thereof may be omitted.

<Overall Configuration of Device>

FIG. 1 shows a basic configuration of a composite automatic analysis device according to an embodiment. Here, an example of the composite automatic analysis device that performs a biochemical analysis and a blood coagulation analysis (blood coagulation fibrinolysis marker, and blood coagulation time measurement) will be described as an embodiment of the automatic analysis device. In the present example, the automatic analysis device includes an absorption photometer and a light-scattering photometer that perform the biochemical analysis and the blood coagulation fibrinolysis marker analysis, the light-scattering photometer that performs blood coagulation time measurement, and an ISE unit that performs an electrolyte analysis.

More specifically, as shown in this figure, an automatic analysis device 1 mainly includes a reaction disk 10, a sample disk 20, a first reagent disk 30-1, a second reagent disk 30-2, and an absorption photometer 40, a light-scattering photometer 45, a blood coagulation time measuring unit 50, an ISE unit 60, a computer 70 and the like.

The reaction disk 10 serving as a reaction container holding unit is a disk-shaped unit intermittently rotatable in a left-right direction. Many reaction cells 11 formed of a translucent material can be disposed along a circumferential direction on the reaction disk 10. The reaction cells 11 are maintained at a predetermined temperature (for example, 37° C.) by a thermostatic tank 12.

Many sample containers 21 that accommodate biological samples, such as blood and urine, can be respectively disposed along circumferential directions of a circle on an inner side and a circle on an outer side in the example of the configuration shown in the figure on the sample disk 20 serving as a sample container holding unit.

A sample dispensing mechanism 22 is disposed in a vicinity of the sample disk 20. The sample dispensing mechanism 22 suctions a predetermined amount of sample from a sample container 21 which is located at a dispensing (suctioning) position on the sample disk 20, and discharges the sample into a reaction cell 11 which is at a dispensing (suctioning) position 10a on the reaction disk 10.

On the first reagent disk 30-1 and the second reagent disk 30-2 that serve as reagent container holding units, a plurality of first reagent bottles 31-1 and second reagent bottles 31-2, which are attached with labels indicating reagent identification information, are respectively disposed along circumferential directions of the first reagent disk 30-1 and the second reagent disk 30-2. The reagent identification information includes a barcode, an RFID and the like, and a case where the barcode is used will be described as an example here. Reagent solutions corresponding to analysis items to be analyzed by the automatic analysis device 1 are accommodated in the first reagent bottles 31-1 and the second reagent bottles 31-2.

A first reagent barcode reading device 32-1 and a second reagent barcode reading device 32-2 read reagent barcodes attached to outer walls of the first reagent bottles 31-1 and the second reagent bottles 31-2 during reagent registration. The read reagent information is registered in a memory 77 together with position information of the first reagent disk 30-1 and the second reagent disk 30-2. A first reagent dispensing mechanism 33-1 and a second reagent dispensing mechanism 33-2 are disposed in the vicinities of the first reagent disk 30-1 and the second reagent disk 30-2, respectively. During reagent dispensing, by pipette nozzles included in such reagent dispensing mechanisms, reagents are suctioned from the first reagent bottle 31-1 and the second reagent bottle 31-2, which correspond to test items and respectively located at a dispensing (suctioning) position 30-1a on the first reagent disk 30-1 and at a dispensing (suctioning) position 30-2a on the second reagent disk 30-2, and are discharged into the corresponding reaction cells 11 respectively located at dispensing (discharging) positions 10b and 10c on the reaction disk 10. The reaction disk 10 is stored in the thermostatic tank 12 and maintained at a constant temperature of about 37° C.

Here, the absorption photometer 40 is disposed on an outer circumferential side of the reaction disk 10. Light, which is emitted from a light source 41 (for the absorption photometer) disposed in a vicinity of a central portion on an inner circumferential side of the reaction disk 10, passes through the reaction cell 11 and is measured by the absorption photometer 40, so that measurement of a reaction solution is performed. As described above, a measuring unit including the absorption photometer 40 and the light source 41 (for the absorption photometer), which are disposed to face each other with the reaction disk 10 interposed therebetween, is set as a first measuring unit.

The light-scattering photometer 45 is also disposed on the outer circumferential side of the reaction disk 10. Light, which is emitted from a light source 46 (for the light-scattering photometer) disposed in the vicinity of the central portion on the inner circumferential side of the reaction disk 10, is scattered via the reaction cell 11 and is measured by the light-scattering photometer 45, so that measurement of the reaction solution is performed. As described above, a measuring unit including the light-scattering photometer 45 and the light source 46 (for the light-scattering photometer), which are disposed to face each other with the reaction disk 10 interposed therebetween, is set as a second measuring unit.

Each reaction cell 11, which accommodates the reaction solution that is a mixture of the sample and the reagent, is photometrically measured every time when the reaction cell 11 crosses in front of the absorption photometer 40 and light-scattering photometer 45 during rotation of the reaction disk 10. Analog signals of the transmitted light and the scattered light that are measured for each sample are input to A/D (analog/digital) converters 72 and 73. An inside of a used reaction cell 11 is cleaned by a reaction cell washing mechanism 34 disposed in a vicinity of the reaction disk 10 to allow repeated use.

Next, a control system and a signal processing system in the automatic analysis device 1 of FIG. 1 will be briefly described. The computer 70 is connected to A/D converters 72 to 75 and a control computer 76 via an interface 71. The computer 70 transmits a signal serving as a command to a control computer 76 of each mechanism, and controls operation of each mechanism such as the sample dispensing mechanism 22, and reagent dispensing mechanism reagents 33-1 and 33-2. Photometric values converted into digital signals by the A/D converters 72 to 75 are input into the computer 70.

The memory 77, which is a storage device, is connected to the interface 71, and stores information such as the reagent identification information, sample identification information, analysis parameters, contents requested by analysis items, calibration results, and analysis results.

The figure illustrates that the control computer 76 is connected to each component and controls the entire automatic analysis device, but the control computer 76 can also be configured to include a control part that can independently control each component.

Next, an item to be measured by the absorption photometer 40 of the automatic analysis device 1 of FIG. 1 is set as a first measuring item, an item to be measured by the light-scattering photometer 45 is set as a second measuring item, and analysis operation during analyses of the first measuring item and the second analysis item will be described. Analysis parameters related to items that can be analyzed by the automatic analysis device 1 are input by an operator in advance via an operation screen 68, and are stored in a memory 67. In order to analyze a test item requested and instructed for each sample, the sample dispensing mechanism 22 dispenses a predetermined amount of sample from the sample container 21 to the reaction cell 11 at the dispensing position 10a according to the analysis parameters.

The reaction cell 11 to which the sample is dispensed is transferred by rotation of the reaction disk 10 and stopped at the dispensing (reagent receiving) position 10b or 10c. The first reagent dispensing mechanism 33-1 and the second reagent dispensing mechanism 33-2 dispense a predetermined amount of reagent solutions into the reaction cells 11 according to the analysis parameters of corresponding test items. Here, as for a dispensing order between the sample and the reagent, the reagent may be dispensed prior to the sample as opposed to the example described above.

When crossing photometric positions, the reaction cell 11 is photometrically measured by the absorption photometer 40 and the light-scattering photometer 45, and voltage changes obtained by changes in light intensities are digitally converted by the A/D converter (for the absorption photometer) 72 and the A/D converter (for the light-scattering photometer) 73. Thereafter, converted data is input into the computer 70 via the interface 71. According to the configuration using such a turntable reaction disk 10, the samples can be dispensed continuously by a rotation motion of the disk, so that the processing capability can be high.

Next, the computer 70 calculates concentration data based on numerical data converted into signal values as described above and calibration curve data measured and stored in advance by an analysis method specified for each test item, and outputs the calculated concentration data to the operation screen 78.

The above-described calculation of the concentration data may be performed by the control computer 76 instead of the computer 70.

Next, an item to be measured by a coagulation time unit of the automatic analysis device 1 of FIG. 1 is set as a third measuring item, and analysis operation during an analysis of the third measuring item will be described. Here, a measuring unit configured with a coagulation time detection unit 50 is set as a third measuring unit. Reaction containers (disposable reaction containers) 52 accommodated in a reaction container accommodation unit 53 are transferred to a sample dispensing station 54 by a reaction container transfer mechanism 55. The sample dispensing mechanism 22 suctions the sample from the sample container 21 and dispenses the sample to the disposable reaction container 52 transferred to the sample dispensing station 54 as described above.

Next, the reaction container (the disposable reaction container) 52 to which the sample is dispensed is transferred to the coagulation time detection unit 50 by the reaction container transfer mechanism 55, and a temperature of the reaction container 52 is raised to 37° C. On the other hand, the first reagent dispensing mechanism 33-1 suctions the reagent cooled at the first reagent disk 30-1 from a first reagent bottle 32-1 corresponding to a test item, discharges the suctioned reagent into a corresponding empty reaction cell 11 disposed on the reaction disk 10, and a temperature of the reaction cell 11 is raised to about 37° C. Here, the case where the reagent in the first reagent bottle 32-1 disposed on the first reagent disk 30-1 is used for an analysis is described as an example, but depending on analysis conditions, the reagent in a second reagent bottle 32-2 disposed on the second reagent disk 30-2 can also be used for the third measuring item.

After a predetermined time, the reagent accommodated in the reaction cell 11 whose temperature is raised as described above is suctioned by a reagent dispensing mechanism 56 with a reagent temperature-raising function, and then the temperature in the mechanism is further raised (to, for example, 40° C.). Here, the reaction container (the disposable reaction container) 52 whose temperature is raised to 37° C. and that accommodates the sample as described above is transferred by the reaction container transfer mechanism 55 to a measuring channel 51 in the coagulation time detection unit 50 to be described below. Thereafter, the reagent dispensing mechanism 56 with the reagent temperature-raising function discharges the temperature-raised reagent to the reaction container (the disposable reaction container) 52. The reagent is discharged, thereby starting a blood coagulation reaction between the sample and the reagent in the reaction container (the disposable reaction container) 52.

The coagulation time detection unit 50, which is the third measuring unit, includes a plurality of measuring channels 51 each configured with a light source and a light receiving unit that are not shown in the figure. After the reagent is discharged as described above, the light receiving unit collects measured data based on transmitted light or scattered light at a predetermined short measuring time interval (for example, 0.1 second). The collected measured data is converted by an A/D converter (for coagulation time unit) 74 into a digital form of a voltage change obtained by a change in a light intensity, and the converted data is input into the computer 70 via the interface 71. The computer 70 uses the numerical data converted in this manner to obtain blood coagulation time. Then, based on the obtained blood coagulation time and on calibration curve data prepared and stored in advance according to a test item, concentration data of a target test item is obtained, and the obtained concentration data is output to the operation screen 78 of the computer 70. The used reaction container (the disposable reaction container) 52 is transferred by the reaction container transfer mechanism 55, and is discarded to a reaction container discarding unit 57. Here, the above-described blood coagulation time and concentration data can also be calculated by the control computer 76.

Next, an item to be measured by the ISE unit 60 of the automatic analysis device 1 of FIG. 1 is set as a fourth measuring item, and analysis operation during an analysis of the fourth measuring item will be described. Here, a measuring unit configured with the ISE unit 60 is set as a fourth measuring unit. The sample dispensing mechanism 22 dispenses a predetermined amount of sample into an ISE dilution tank 61. After a dilute solution is dispensed to the ISE dilution tank 61, the sample is measured when passing through an Na electrode 62, a K electrode 63, a Cl electrode 64 and a reference electrode 65 together with an internal standard solution reagent, and measured data is converted by the A/D converter (for the ISE unit) 75, and converted data is recorded as an electromotive force to the reference electrode 65.

Here, the control computer 76 of the automatic analysis device 1 individually controls a temperature control substrate and a motor controller for each of the absorption photometer 40, the light-scattering photometer 45, the coagulation time detection unit 50, and the ISE unit 60. Measured data is also respectively connected to and independently controlled by the different A/D converters 72 to 75. That is, when any mechanism is not used, setting of not using a specific unit is selected to only cause a necessary unit to move.

Next, a flow of measuring during execution of a test using the automatic analysis device 1 will be described. After turning on power of the device, the operator performs preparations necessary for an analysis of that day. During the preparations, the operator advances operation with reference to a system overview screen displayed on the operation screen 78.

Embodiment 1

FIG. 2 is a diagram showing an example of a system overview screen of the automatic analysis device according to the present embodiment, and is a screen displayed on the operation screen 78 of the automatic analysis device in FIG. 1.

The system overview screen mainly includes a work flow display region 201 and an overview display region 202.

The work flow display region 201 shows a flow of a series of required operations including from preparations before measurement necessary for performing a test to collection of results after measurement. The work flow display region 201 is mainly provided with a maintenance button 203, a measured result saving and deletion button 204, a reagent and consumable preparation button 205, a calibration and QC button 206, a sample disk monitoring button 207, and a QC result accumulation button 208, and the operator performs operation according to this order of buttons. Here, QC indicates quality control, and a control sample is measured, so that a result after calibration is checked to determine whether there is a problem, or the calibration and QC button is used to regularly check whether there is a problem with a condition of the device or a condition of the reagents.

As shown in FIG. 2, information stored in the memory 77 such as an execution state of maintenance, a remaining amount of currently loaded reagents, and execution states of calibration and measurement of the control sample is reflected in the work flow display region 201 on the operation screen 78 in FIG. 1. Here, on the operation screen 78, it is possible to set in advance a maintenance cycle and a preparation level of expiration date reagents and consumables in the calibration and measurement of the control sample. When a set value is reached (that is, for example, when an expiration date is closer than a set value, or when a preparation level of consumables is lower than a set value), states of the maintenance button 203, the reagent and consumable preparation button 205, and the calibration and QC button 206 are changed and distinguished by colors or marks or the like, thereby informing the operator of necessity of preparations.

The overview display region 202 includes a unit necessity-of-use selection area 209 and a use state display area 210. In the unit necessity-of-use selection area 209, check boxes corresponding to units to be used are checked, thereby setting the corresponding units usable. FIG. 2(*a*) shows a state where check boxes of all units are valid (ticked), and all the units are usable. In FIG. 2(*b*), the ISE unit is not checked, and the coagulation time unit, the absorption photometer, and the light-scattering photometer are checked. FIG. 2(*b*) indicates that setting of only not using the ISE unit (using all the units except the ISE unit) is selected. In this manner, selecting setting of not using a specific unit is referred to as unit masking. In the use state display area 210, an unusable mark is added to the ISE unit by the unit masking. Similarly, in the unit necessity-of-use selection area 209 in FIG. 2(*c*), the coagulation time unit is not checked, and the ISE unit, the absorption photometer, and the light-scattering photometer are checked. That is, the coagulation time unit is in a masked state, and in the use state display area 210 in this state, the coagulation time unit can be easily recognized by methods such as adding a mark indicating that the coagulation time unit cannot be used and color coding.

Figure 5:
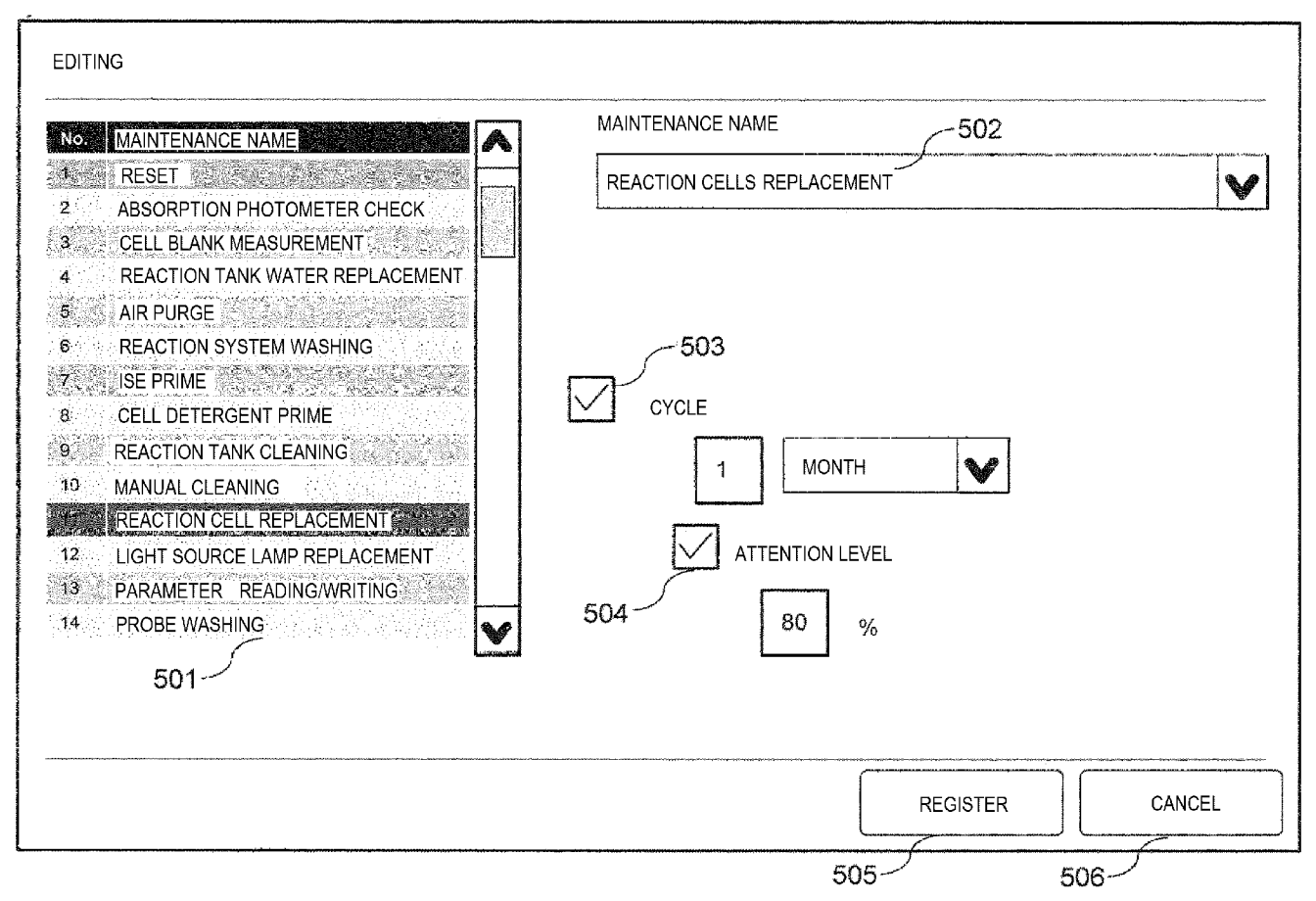

Next, a function and a display color of each button in the work flow display region 201 will be described with reference to FIGS. 3 to 8.

<Maintenance Button>

The maintenance button 203 manages time limit information of each maintenance item set in advance and elapsed time since last execution of maintenance, and is displayed in yellow (at a caution level) or red (at a warning level) to prompt the operator to perform the maintenance based on these pieces of information. FIG. 3 shows an example of a maintenance screen of the automatic analysis device according to the present embodiment. In FIG. 3(*a*), a mode 301 that displays all maintenance is set. At this time, ISE Prime, which is maintenance related to ISE, is in a state where time has passed since last execution thereof and the maintenance is required. In this case, an item of the ISE Prime of No. 7 in a maintenance list is colored and a user is recommended to perform maintenance. At this time, for example, as described above with reference to FIG. 2(*b*), since the ISE unit is in a masked state and is not used, it is not necessary to perform maintenance related to the unit. That is, if the maintenance button 203 of FIG. 2(*b*) is colored and maintenance is recommended despite the state as described above, work such as preparations unnecessary for the operator may occur. Therefore, as shown in FIG. 3(*b*), a mode 302 that does not display recommendation of maintenance to be performed in a masked unit is selected, so that the recommendation is removed without coloring of the item of the ISE Prime of No. 7 in the maintenance list, to ensure that the user does not perform unnecessary maintenance. At this time, in the work flow display region 201 of FIG. 2(*b*), the maintenance button 203 is also not colored due to the item of the ISE prime. FIGS. 3(*a*) and 3(*b*) show examples of selecting by radio buttons, but other selection methods such as switching by a tab, and selecting by a pull-tab can also be applied. Here, FIG. 4 shows an example of a display setting screen during the unit masking of the automatic analysis device according to the present embodiment. As shown in the figure, it is also possible to set necessity of display information such as maintenance, calibration, and QC regarding the masked unit on a screen different from the maintenance screen of FIG. 3 in advance. FIG. 4 shows the example of the screen for setting the necessity of display for each item, but it is also possible to set a screen for setting a uniform display format for all items so as to perform collective selection.

FIG. 5 shows an example of a setting screen of a maintenance cycle for the automatic analysis device according to the present embodiment. The setting screen of the maintenance cycle mainly includes a maintenance list 501, a maintenance name selection area 502, a cycle input area 503, and an attention level setting area 504. The operator sets an execution cycle suitable for each maintenance.

For example, a reaction cell replacement cycle in FIG. 5 is set in advance to be once a month, and the attention level is set to be displayed in color or the like at a time point when 80% of a set number of days has elapsed. After a time limit is set, setting is registered if a registration button 505 is pressed, and contents of the registered setting are canceled if a cancel button 506 is pressed. That is, in this case, when 24 days have elapsed after replacement of the reaction cells, which is the time point when 80% of the set number of days has elapsed, and when one month has elapsed, which is a time point when the set number of days has been reached, display colors of the maintenance button 203 in FIG. 2 changes to yellow, red or the like, respectively. A maintenance item for which a time limit is desired to be set can be selected from the maintenance list 501 shown in FIG. 5, and for the selected maintenance item, an expiration date can be set in the maintenance name selection area 502 in unit of a day, a week, or a month. Further, an attention level for the set cycle can be set, for example, in percentage (%) or the like in the attention level setting value field 504 of an elapsed time period.

<Reagent and Consumable Preparation Button>

At the reagent and consumable preparation button 205 shown in FIG. 2, based on a database of reagents and consumables that are currently disposed on the device, the reagent and consumable preparation button is identified and displayed by a color or a mark when there is an analysis item whose current remaining amount is 0. Similarly, for the attention level set in advance, when there is an analysis item whose current remaining amount is smaller than a remaining amount of the attention level, the reagent and consumable preparation button 205 is identified and displayed by a color or a mark different from that of a warning display. Since the number of measuring requests is usually different for each item, it is desirable that the reagent attention level can be set individually for each measuring item.

Here, FIG. 6 shows an example of reagent disk overview screen of the automatic analysis device according to the present embodiment. FIG. 6(*a*) shows a screen set to display all reagent information, and FIG. 6(*b*) shows a screen set so as not to display reagent information of a masked unit. The reagent disk overview screen includes reagent information display parts 601-1 and 601-2 for analysis, a detergent information display part 602, a display switching area 603, and a reagent replacement information printing button 604.

The reagent information display parts 601 for analysis are diagrams schematically showing the first reagent disk 30-1 and the second reagent disk 30-2 in the automatic analysis device 1, and are distinguished by colors, for example, a red color when a remaining amount in a reagent bottle is 0, and a yellow color if the remaining amount is less than or equal to an attention level set in advance, and by design patterns and the like, so that a remaining amount loaded on the reagent disk can be easily determined. The detergent information display part 602 indicates detergents used in a system, and states of the consumable information display part 602 are distinguished by display colors, such as a red color if a remaining amount is 0, and a yellow color if the remaining amount is less than or equal to a set value, and by design patterns and the like, which is similar to those of the reagent information display parts 601 for analysis.

Here, it is assumed that reagents used in the coagulation time unit are disposed at positions 10 to 12 of 601-1 and 602-2. In this case, as shown in FIG. 6(*a*), if the display switching area 603 is set to display all reagent information, information of all reagents loaded on the reagent disk is displayed. However, as described above with reference to FIG. 2(*c*), when the coagulation time unit is masked, analyses of the reagents at the positions 10 to 12 of 601-1 and 602-2 are not necessary, so that it is not necessary to prepare the reagents.

As in the related art, if reagents disposed on the reagent disk are collectively managed even when the coagulation time unit is masked as in FIG. 2(*c*), information on all the reagents is still displayed, and unnecessary preparations are still recommended to the user. In contrast, in the present embodiment, a display is set on which information of a unit to be measured for each item is reflected, so that reagent information and a measuring unit can be managed in association with each other. Here, methods for associating the reagent information with information of the measuring unit include associating an item code with each measuring unit (the item code is linked to the reagent information), specifying a measuring unit for each item on an analysis parameter screen of an operation screen, and describing the measuring unit with a reagent barcode and the like.

For a reagent associated with a measuring unit, if a target measuring unit is usable, reagent replacement will be recommended. On the other hand, when a specific measuring unit is unusable (in a masked situation), reagent replacement related to the masked measuring unit is not recommended. For example, in the display switching area 603 in FIG. 6(*b*), since reagents to be used by a masked unit are set so as not to be displayed, information on reagents to be measured by the coagulation time unit is not displayed.

In this case, since the reagent and consumable preparation button 205 in FIG. 2(*c*) is not identified and displayed by being colored in red or the like, the operator is not likely to perform unnecessary preparation work, and can definitely perform necessary preparation work.

FIG. 7 is a diagram showing an example of a reagent replacement information printing screen of the automatic analysis device according to the present embodiment. As shown in the figure, when reagent replacement information is printed, necessity of printing reagents to be used by a masked unit can also be selected. In the present embodiment, the reagent replacement information printing screen can be displayed by clicking a reagent replacement information printing button 606 shown in FIG. 6, but the invention is not limited thereto.

<Calibration and QC Button>

FIG. 8 is a diagram showing an example of a calibration and QC screen of the automatic analysis device according to the present embodiment. The calibration and QC button 206 shown in FIG. 2 indicates an execution state of calibration and a measurement state of control, and the calibration and QC button 206 is clicked, thereby displaying the screen shown in the figure.

Regarding the calibration, when the calibration is not performed for the reagents disposed on the device, or when an expiration date of the calibration has expired, or when control measurement fails or the like, it is necessary to perform the calibration or re-measure the control based on a reagent information database currently disposed on the device. Therefore, the calibration and QC button is identified and displayed by colors or the like in FIG. 2, so that it is possible to recommend the operator to perform the calibration or re-measure the control. When the calibration is recommended, the calibration and QC button 206 is clicked, so that the screen of FIG. 8 is displayed, and a recommended item collective request button 801 is identified and displayed by, for example, being colored in yellow. When clicking the of recommended item collective request button 801 here, the operator can easily request execution of items for which calibration is recommended.

Similarly, also regarding the control measurement, when an expiration date of the control has expired or the like for the reagents disposed on the device, there is a function of recommending the control measurement based on the reagent information database currently disposed on the device. In this case, when the control measurement is recommended, the calibration and QC button is also identified and displayed by colors or the like in FIG. 2. When the QC is recommended, the calibration and QC button 206 is clicked, so that the screen of FIG. 8 is displayed, and a recommended item collective request button 802 is identified and displayed by, for example, being colored in yellow. When clicking the recommended item collective request button 802 here, the operator can easily request execution of items for which control measurement is recommended.

Here, as described above, the calibration and QC button 206 is identified and displayed by colors or the like in the system overview screen of FIG. 2, so that the operator can easily recognize that the calibration and the control measurement are recommended.

However, for example, when the coagulation time unit is masked as shown in FIG. 2(*c*), it is not necessary to perform the calibration or the control measurement for a coagulation time item. At this time, reagents of the coagulation time item are consumed wastefully when a collective request is made, and therefore, calibration and control of an item to be measured by a masked unit can be set so as not to be recommended.

FIG. 9 shows an example of a calibration recommendation screen of the automatic analysis device according to the present embodiment. When the reagents are being replaced or the control measurement fails, a display color is changed for each item in a recommendation factor 901 field, thereby displaying recommendations of the calibration to the user. However, when the coagulation time unit is masked in FIG. 2(*c*), it is not necessary to perform the calibration for the coagulation time item (an item name thereof in the figure is PT), so that a display color is not changed even if there is a recommendation factor. For example, the recommended item collective request button 801 of the calibration in FIG. 8 is selected, thereby transitioning screens from the screen of FIG. 8 to the screen of FIG. 9.

Here, the above-described embodiment shows an example in which information on the measuring unit selected or not selected in the unit necessity-of-use selection area 209 in the overview display region 202 is made to correspond to a display in the work flow display region 201 or a display on a screen transitioned from each button in the work flow display region 201. It should be noted that it is also possible to adopt a configuration in which reagent information, calibration, and control measurement for an unused item is also not recommended when the user individually performs masking for each item. Further, in the above-described embodiment, it is possible to select whether to reflect display setting during the unit masking on the screens such as the maintenance screen (FIG. 3), the display setting screen during the unit masking (FIG. 4), the reagent disk overview screen (FIG. 6), and the calibration recommendation screen (FIG. 9). It should be noted that it is also possible to reflect display setting of a unit masking screen without selecting the display setting during the unit masking (without a mode that displays all information regardless of setting of the unit masking).

The invention is not limited to the embodiment described above, and includes various modifications. For example, the embodiment described above has been described in detail for easy understanding of the invention, and is not necessarily limited to those having all the configurations described above. A part of the configuration of one embodiment can be replaced with the configuration of another embodiment, and the configuration of another embodiment can be added to the configuration of one embodiment. A part of the configuration of each embodiment may be added, deleted, or replaced with another configuration.

REFERENCE SIGN LIST 1 automatic analysis device
10 reaction disk
10a, 10b, 10c dispensing (discharging) position
11 reaction cell
12 thermostatic tank
20 sample disk (specimen disk)
20a dispensing (suctioning) position
21 sample container
22 sample dispensing mechanism
23 sample barcode reading device (sample barcode reader)
24 sample identifier
30 reagent disk
30-1 first reagent disk
30-2 second reagent disk
30-1a, 30-2a dispensing (suctioning) position
31 reagent bottle
31-1 first reagent bottle
31-2 second reagent bottle
32 reagent barcode reading device (reagent barcode reader)
32-1 first reagent barcode reading device
32-2 second reagent barcode reading device
33 reagent dispensing mechanism
34 reaction cell washing mechanism
40 absorption photometer
41 light source (for absorption photometer)
45 light-scattering photometer
46 light source (for light-scattering photometer)
50 coagulation time detection unit
51 measuring channel
52 reaction container (disposable reaction container)
53 reaction container accommodation unit
54 sample dispensing station
54 reaction container transfer mechanism
56 reagent dispensing mechanism with temperature raising function
57 reaction container discarding unit
60 ISE unit
61 ISE dilution tank
62 Na electrode
63 K electrode
64 Cl electrode
65 reference electrode
70 computer
71 interface
72 A/D converter (for absorption photometer)
73 A/D converter (for light-scattering photometer)
74 A/D converter (for coagulation time unit)
75 A/D converter (for ISE unit)
76 control computer
77 memory
78 operation screen
79 keyboard

The invention claimed is:

1. An automatic analysis device, comprising:
a sample disk configured to hold a sample container that is configured to accommodate a sample;
a reagent disk configured to hold a plurality of reagent containers each is configured to a accommodate a reagent;
at least two or more different measuring units configured to respectively perform different types of analysis, respectively;
a control part configured to control the measuring units and a display part; and
the control part is configured to:
control the display part to display a work flow area in which a flow of operation of the two or more measuring units is displayed, and an overview area in which usable or unusable states of the respective measuring units are displayed, wherein the overview area includes a unit necessity-of-use selection part that allows selecting the necessity-of-use of each of the measuring units;
control the display part to change a display of the work flow area on the basis of information set in the unit necessity-of-use selection part; and
control the display part to display a reagent overview screen indicating information on an arrangement of the reagent held on the reagent disk,
wherein when at least one of the two or more measuring units is not selected for use in the unit necessity-of-use selection part that allows selecting of necessity-of-use of each of the two or more measuring units, the display part is controlled so as not to display the information on the remaining amount of reagent and arrangement of a reagent container, which is present on the reagent disk but is to be used by the at least one of the two or more measuring units that is not selected for use, on the reagent overview screen.

2. The automatic analysis device according to claim 1, wherein
the work flow area includes at least one button for checking more detailed information on maintenance, a reagent and a consumable, calibration and control measurement as operation information on measurement preparations for the measuring units.

3. The automatic analysis device according to claim 2, wherein
the control part is configured to control the display part to display identification information by a color or a mark on a button on the basis of information on necessity of a corresponding measurement preparation.

4. The automatic analysis device according to claim 1, wherein
the display part is configured to display a setting part that allows setting of whether to change the display of the work flow area on the basis of the information set in the unit necessity-of-use selection part.

5. The automatic analysis device according to claim 4, wherein
a flow of operation of the measuring units shown in the work flow area includes at least two of: maintenance, a reagent and a consumable, calibration and control measurement, as operation information on measurement preparations for the measuring units, and the setting part allows setting of whether to change the display of the work flow area for each or all of the two or more pieces of operation information on the basis of the information set in the unit necessity-of-use selection part.

6. The automatic analysis device according to claim 1, wherein when a button for checking more detailed information on the maintenance is selected in the work flow area, the control part is configured to control the display part to display a maintenance screen that recommends execution for each maintenance item on the basis of cycle information set in advance and information on elapsed time since last execution of maintenance.

7. The automatic analysis device according to claim 1, wherein when a button for checking more detailed information on the calibration and the control measurement is selected in the work flow area, the control part is configured to control the display part to display a calibration and control screen that recommends execution of the calibration and/or control measurement on the basis of information on an execution state of the calibration and on a state of the control measurement.

8. An automatic analysis device, comprising:

a sample disk configured to hold a sample container that is configured to accommodate a sample;

a reagent disk configured to hold a plurality of reagent containers each configured to a accommodate a reagent;

at least two or more different measuring units configured to respectively perform different types of analysis, respectively;

a control part configured to control the measuring units and a display part; and the control part is configured to:

control the display part to display a work flow area in which a flow of operation of the two or more measuring units is displayed, and an overview area in which usable or unusable states of the respective measuring units are displayed, wherein the overview area includes a unit necessity-of-use selection part that allows selecting the necessity-of-use of each of the measuring units;

control the display part to change a display of the work flow area on the basis of information set in the unit necessity-of-use selection part; and control the display part to display a reagent overview screen indicating information on an arrangement of the reagent held on the reagent disk, when at least one of the two or more measuring units is selected for use in the unit necessity-of-use selection part that allows selecting of necessity-of-use of each of the two or more measuring units, the display part is controlled so as to display the information on the remaining amount of reagent and arrangement of a reagent container, which is present on the reagent disk and is to be used by the at least one of the two or more measuring units that is selected for use, on the reagent overview screen.

9. The automatic analysis device according to claim 8, wherein the work flow area includes at least one button for checking more detailed information on maintenance, a reagent and a consumable, calibration and control measurement as operation information on measurement preparations for the measuring units.

10. The automatic analysis device according to claim 9, wherein the control part is configured to control the display part to display identification information by a color or a mark on a button on the basis of information on necessity of a corresponding measurement preparation.

11. The automatic analysis device according to claim 8, wherein the display part is configured to display a setting part that allows setting of whether to change the display of the work flow area on the basis of the information set in the unit necessity-of-use selection part.

12. The automatic analysis device according to claim 11, wherein a flow of operation of the measuring units shown in the work flow area includes at least two of: maintenance, a reagent and a consumable, calibration and control measurement, as operation information on measurement preparations for the measuring units, and the setting part allows setting of whether to change the display of the work flow area for each or all of the two or more pieces of operation information on the basis of the information set in the unit necessity-of-use selection part.

13. The automatic analysis device according to claim 8, wherein when a button for checking more detailed information on the maintenance is selected in the work flow area, the control part is configured to control the display part to display a maintenance screen that recommends execution for each maintenance item on the basis of cycle information set in advance and information on elapsed time since last execution of maintenance.

14. The automatic analysis device according to claim 8, wherein when a button for checking more detailed information on the calibration and the control measurement is selected in the work flow area, the control part is configured to control the display part to display a calibration and control screen that recommends execution of the calibration and/or control measurement on the basis of information on an execution state of the calibration and on a state of the control measurement.

* * * * *